(12) United States Patent
Miura et al.

(10) Patent No.: US 8,855,376 B2
(45) Date of Patent: Oct. 7, 2014

(54) FINGER VEIN AUTHENTICATION DEVICE

(75) Inventors: Naoto Miura, Kokubunji (JP);
Takafumi Miyatake, Hachioji (JP);
Akio Nagasaka, Kokubunji (JP);
Harumi Kiyomizu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1168 days.

(21) Appl. No.: 12/185,280

(22) Filed: Aug. 4, 2008

(65) Prior Publication Data

US 2009/0110249 A1    Apr. 30, 2009

(30) Foreign Application Priority Data

Oct. 29, 2007    (JP) .................................. 2007-279780

(51) Int. Cl.
*G06K 9/00* (2006.01)
(52) U.S. Cl.
CPC .. *G06K 9/00006* (2013.01); *G06K 2009/00932* (2013.01); *G06K 2009/0006* (2013.01)
USPC .......................................... 382/115; 382/124
(58) Field of Classification Search
None
See application file for complete search history.

(56) References Cited

U.S. PATENT DOCUMENTS

| | | | | |
|---|---|---|---|---|
| 3,576,538 | A * | 4/1971 | Miller ........................... | 235/380 |
| 2002/0028004 | A1 | 3/2002 | Miura et al. | |
| 2004/0184641 | A1 | 9/2004 | Nagasaka et al. | |
| 2005/0254690 | A1 * | 11/2005 | Nagasaka et al. ............. | 382/115 |
| 2006/0243803 | A1 | 11/2006 | Hauke et al. | |
| 2007/0058841 | A1 | 3/2007 | Miura et al. | |
| 2008/0260214 | A1 * | 10/2008 | Hauke et al. ................. | 382/124 |

FOREIGN PATENT DOCUMENTS

| | | |
|---|---|---|
| DE | 10 2004 053 900 A1 | 5/2006 |
| EP | 1 801 750 A1 | 6/2007 |
| JP | 2002-083298 | 3/2002 |
| JP | 3100993 | 2/2004 |
| JP | 2004-078791 | 3/2004 |
| JP | 2005-253988 | 9/2005 |
| JP | 2006-227826 | 8/2006 |
| JP | 2006-285487 | 10/2006 |
| JP | 2007-075305 | 3/2007 |

OTHER PUBLICATIONS

Notification of Reasons for Refusal for corresponding Japanese application No. 2007-279780; Issue date: Jan. 4, 2012.
Extended European Search Report dated Feb. 16, 2012 for application No. 08252642.7.

* cited by examiner

*Primary Examiner* — Kim Vu
*Assistant Examiner* — Fred Hu
(74) *Attorney, Agent, or Firm* — Antonelli, Terry, Stout & Kraus, LLP.

(57) ABSTRACT

The invention provides a finger vein authentication device using plural fingers that enables the plural fingers to be easily presented while maintaining high authentication precision. A finger vein authentication device according to an embodiment of the invention includes light sources that irradiate light onto fingers; imaging elements that photograph light transmitted through the fingers; and an image processing unit that processes the obtained images. The finger vein authentication device further includes a finger placement table that defines a presentation location of the first finger in an anteroposterior direction and other finger placement tables that define locations of all the fingers in a horizontal direction.

9 Claims, 17 Drawing Sheets

FIG.5A
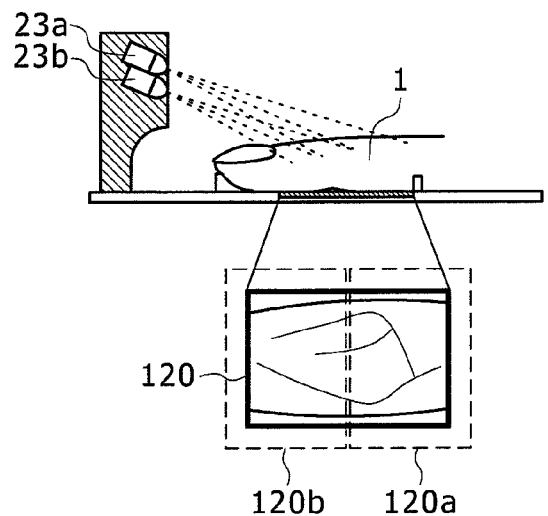
FIG.5B
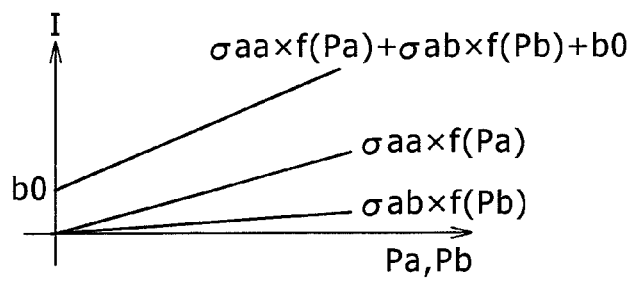
FIG.5C
$$\begin{pmatrix} Ia \\ Ib \end{pmatrix} = \begin{bmatrix} \sigma aa & \sigma ab \\ \sigma ba & \sigma bb \end{bmatrix} \begin{pmatrix} f(Pa) \\ f'(Pb) \end{pmatrix} + \begin{pmatrix} b0 \\ b0 \end{pmatrix}$$

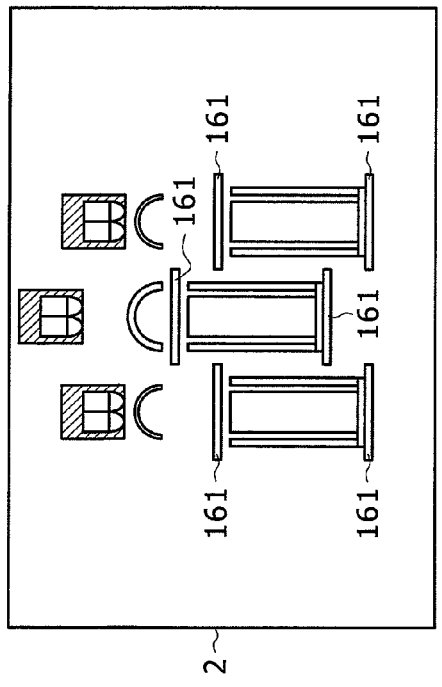
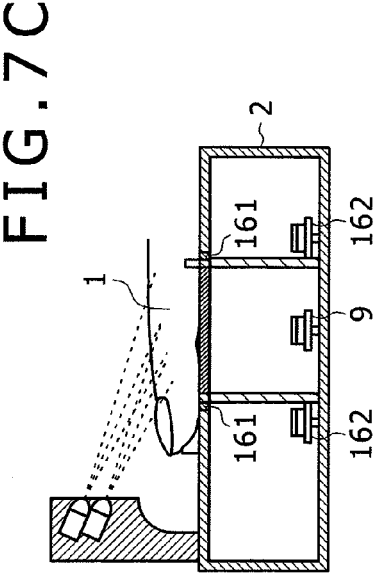
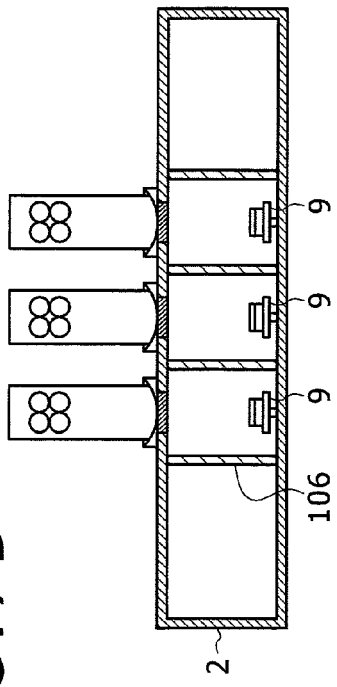
FIG.7A
FIG.7B
FIG.7C

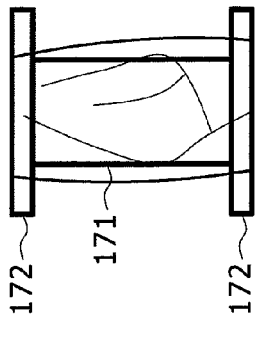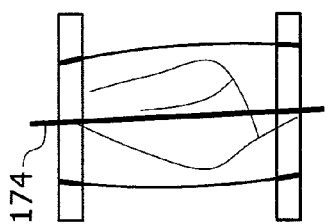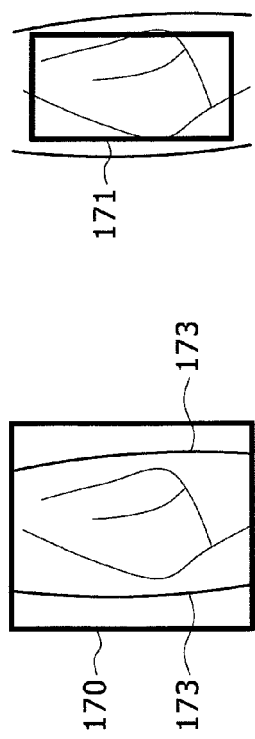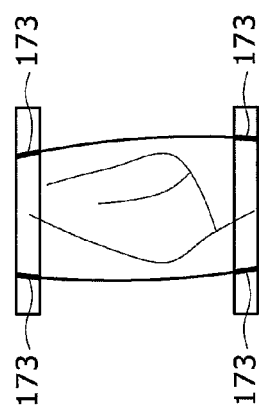

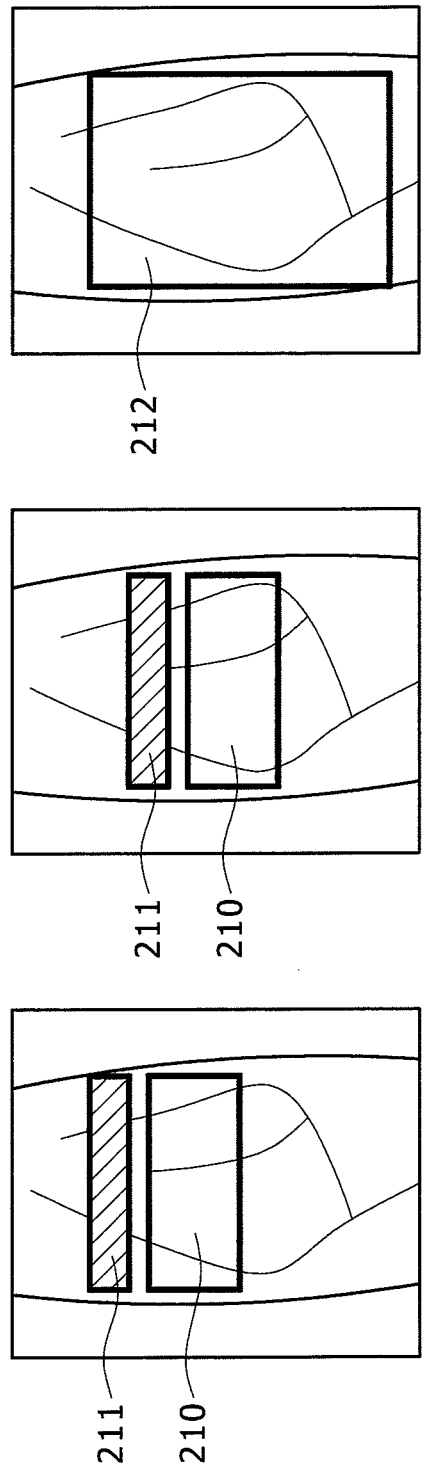

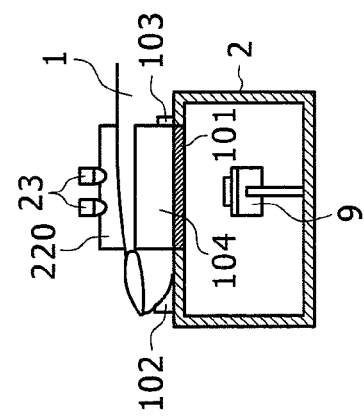
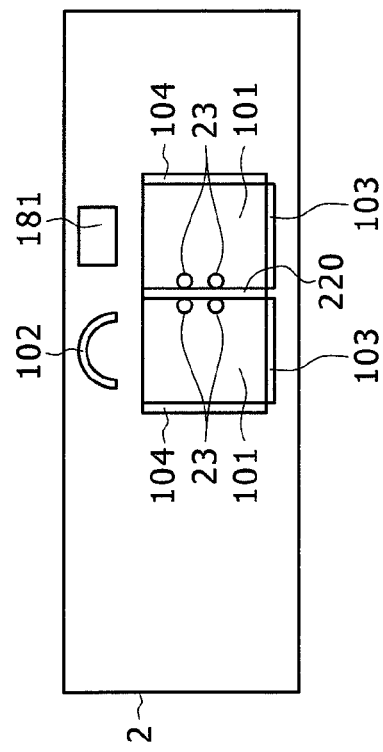
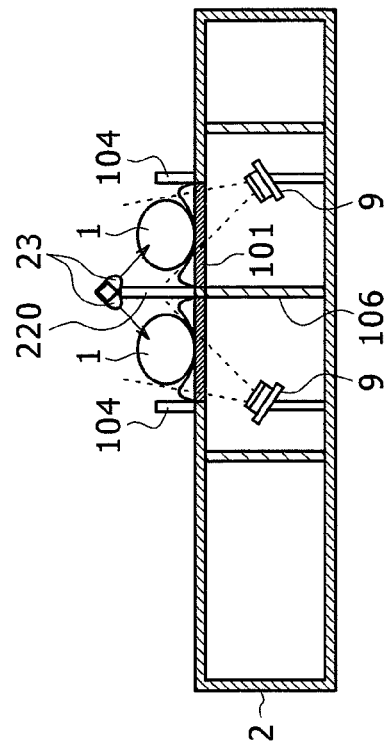

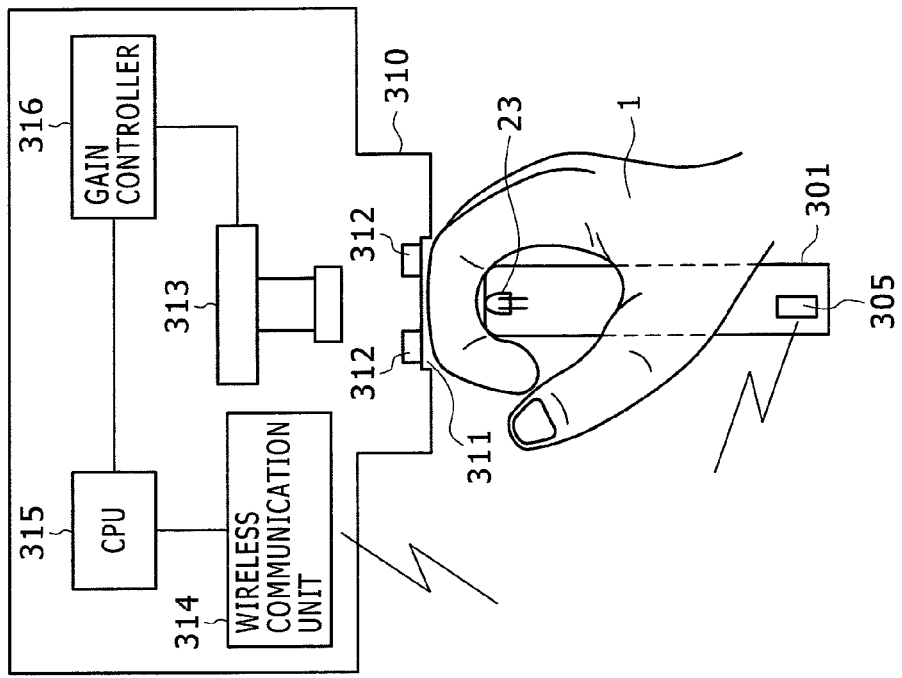
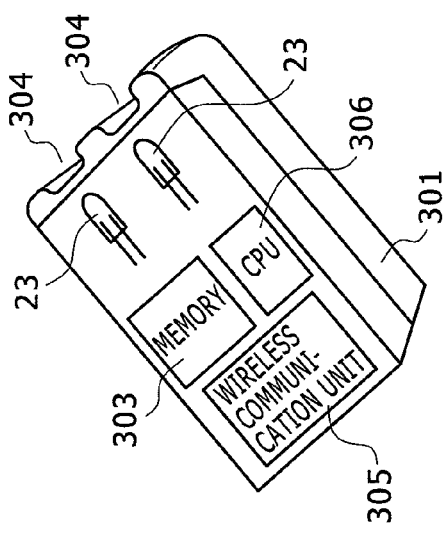
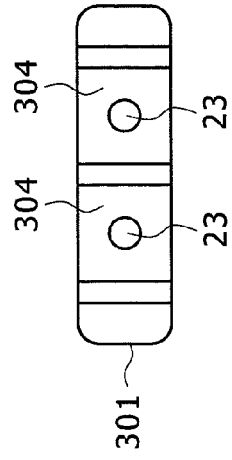

FINGER VEIN AUTHENTICATION DEVICE

CLAIM OF PRIORITY

The present application claims priority from Japanese patent application JP2007-279780 filed on Oct. 29, 2007, the content of which is hereby incorporated by reference into this application.

BACKGROUND OF THE INVENTION

1. Field of the Invention

The present invention relates to a finger vein authentication device, and more particularly, to an improvement technique that can improve authentication precision while maintaining convenience.

2. Description of the Related Art

Among various types of biometric authentication techniques, a finger vein authentication technique has been known as a technique that can achieve high-precision authentication. According to this finger vein authentication technique, since finger vein patterns extracted from a hand are used, superior authentication precision can be achieved, and it is difficult to perform falsification and alteration as compared with a fingerprint authentication technique, thereby achieving high security.

As an example of this type of finger vein authentication in the related art, JP-A-2004-78791 discloses a biometric authentication device. In the biometric authentication device, in order to simultaneously photograph veins of the fingers, the fingers are placed in the device, infrared rays are irradiated onto the fingers from the back side thereof, and light that is transmitted through the palm side of the fingers is photographed.

Further, JP-A-2002-83298 discloses a device that irradiates infrared rays from the upper side.

BRIEF SUMMARY OF THE INVENTION

As an example of a method where plural fingers are used to improve authentication precision, there is a method in which plural fingers are sequentially photographed using a device according to the related art that photographs a single finger. However, this method has a problem in that the fingers need to be repeatedly presented, which becomes inconvenient for a user. In the device that is disclosed in JP-A-2004-78791, since there is no structure that defines a location where each finger is presented, the fingers cannot be guided to a predetermined place, which makes it difficult to reproduce a state at a point of time of registration. Further, when transmission light is irradiated onto the plural fingers, leakage light that is not transmitted through the fingers may be easily generated and contrast of blood vessels may be lowered, which makes it impossible to improve authentication precision. Further, in the case in which plural devices according to the related art where a single finger is presented are arranged, for example, in devices that are disclosed in JP-A-2002-83298 and irradiate infrared rays onto fingers from the upper side, individual fingers need to be simultaneously placed in plural holes and thus it is difficult for a user to use the devices. In an open-typed device that is disclosed in JP-A-2004-78791 and has a structure where light sources are located at both sides of the fingers, in the case where the plural devices are arranged such that the plural fingers can be simultaneously presented, the distance between the devices should be increased due to arrangement of the light sources. Accordingly, if a user does not spread out his/her fingers, the fingers cannot be presented, and people who have small hands cannot use the device.

Accordingly, it is an object of the invention to provide a finger vein authentication device using plural fingers that enables the plural fingers to be easily presented while maintaining high authentication precision.

In order to achieve the above-described object, a finger vein authentication device according to an embodiment of the invention includes light sources that irradiate light onto fingers; imaging elements that photograph light transmitted through the fingers; and an image processing unit that processes the obtained images. The finger vein authentication device further includes a finger placement table that defines a presentation location of the first finger in an anteroposterior direction and other finger placement tables that define locations of all the fingers in a horizontal direction.

According to the aspect of the invention, it is possible to provide a high-precision finger vein authentication device that can be applied to a large-scale authentication system to perform entering and leaving management in an office building or the like.

BRIEF DESCRIPTION OF THE DRAWINGS

FIGS. 5A to 5C are diagrams illustrating a method in which plural light sources adjust the amount of light in a region within one image;

FIGS. 7A to 7C are schematic diagrams illustrating a device for authenticating veins of plural fingers that photographs the outlines of fingers;

FIGS. 8A to 8E are schematic diagrams illustrating a position correction sequence of the fingers in FIGS. 7A to 7C;

FIGS. 12A to 12C are schematic diagrams illustrating a synthesis sequence of partial regions of fingers in FIGS. 11A to 11D;

FIGS. 15A to 15C are schematic diagrams illustrating a device for authenticating veins of plural fingers that irradiates light from an oblique upper side of finger sides and obliquely photographs the palm sides of the fingers;

FIGS. 16A to 16C are schematic diagrams illustrating a device for authenticating veins of plural fingers using a portable terminal and a read device.

DETAILED DESCRIPTION OF THE INVENTION

The preferred embodiments of the invention will be described.

Figure 1:
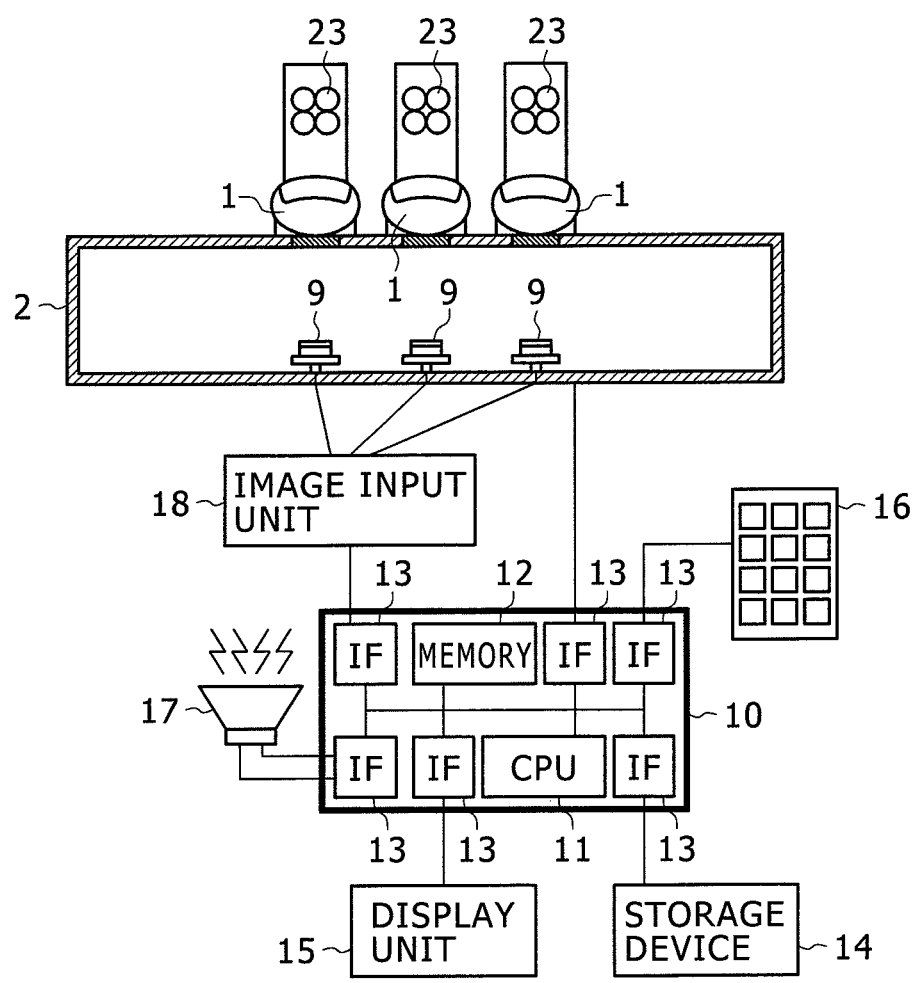
FIG. 1 is a functional block diagram illustrating a finger vein authentication device.

FIG. 1 is a diagram illustrating the configuration of an authentication system according to a first embodiment of the invention.

An authentication system includes an input device 2, an authentication processing unit 10, a storage device 14, a display unit 15, an input unit 16, a speaker 17, and an image input unit 18.

The input device 2 includes light sources 23 and imaging devices 9.

The light source 23 is composed of, for example, an infrared LED, and irradiates infrared light onto fingers 1 that are presented to the input device 2. The imaging device 9 photographs the fingers 1 that are presented to the input device 2. At this time, the number of each of fingers 1, imaging devices 9, and light sources 23 s plural.

The image input unit 18 inputs images obtained by the imaging devices 9 of the input device 2 to the authentication processing unit 10.

The authentication processing unit 10 includes a CPU 11, a memory 12, and various types of interfaces (IF) 13.

The CPU 11 executes programs that are stored in the memory 12 to perform various processes. The memory 12 stores the programs that are executed by the CPU, which will be described below with reference to FIGS. 2A to 2C.

The memory 12 temporarily stores the images that are input from the image input unit 18. The interfaces 13 are connected to devices outside the authentication processing unit 10. Specifically, the interfaces 13 are connected to the input device 2, the storage device 14, the display unit 15, the input unit 16, a speaker 17 or the image input unit 18.

The storage device 14 previously stores registration data of users. The registration data is information that is used to collate the users, for example, images of finger vein patterns. The images of the finger vein patterns are images obtained by photographing blood vessels (finger veins), which are distributed under the skin of the finger at a palmar side, as dark shadow patterns.

The display unit 15 is, for example, a liquid crystal display, and displays information received from the authentication processing unit 10.

The input unit 16 is, for example, a keyboard, and transmits information input by a user to the authentication processing unit 10. The speaker 17 outputs the information received from the authentication processing unit 10.

Figure 2A:
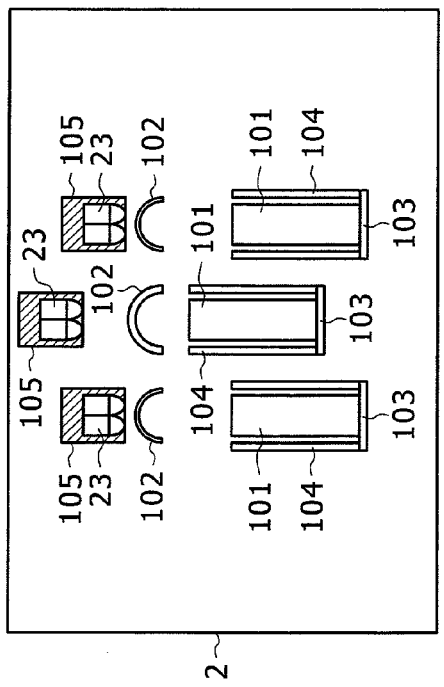
FIGS. 2A to 2C are schematic diagrams illustrating a first form of a device for authenticating veins of plural fingers.
Figure 2C:
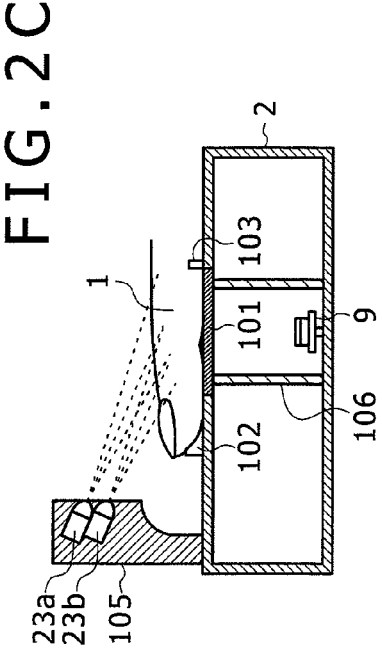
Figure 2B:
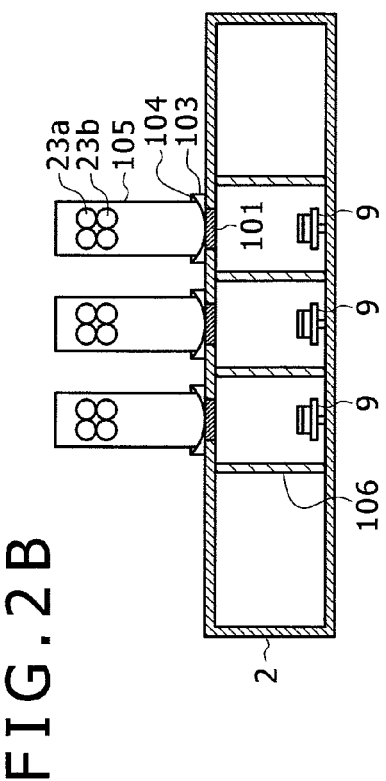

FIGS. 2A to 2C show one embodiment of a finger vein authentication device that simultaneously photographs veins of plural fingers. Specifically, FIG. 2A shows a top view, FIG. 2B shows a front view, and FIG. 2C shows a side view.

At a top surface of the finger vein authentication device, openings 101 that are used to photograph finger veins, finger placement tables 102 for finger tips, finger placement tables 103 for finger base portions, and sidewalls 104 are provided. Here, these constituent elements are called finger presenting units. In this embodiment, three finger presenting units are disposed such that three fingers can be simultaneously placed. In accordance with authentication precision or usability, the number of finger presenting units may be increased or decreased. In regards to intervals between the finger presenting units, the finger presenting units are disposed adjacent to each other at distances at which all fingers having any sizes can be naturally placed without being limited by the sizes of fingers. The middle finger presenting unit is located to protrude more forward than the other finger presenting units that are adjacent to the middle finger presenting unit at both sides thereof. In regards to the locations of the finger placement tables 102 for finger tips, the distances of the finger placement tables 102 in a depthwise direction are the same, and the finger placement tables are arranged in one line. In particular, the finger placement table for a finger tip of the middle finger presenting unit has a larger size than the other finger place tables for finger tips and is emphasized. At the sides of the finger tips, light sources 23 that irradiate light onto the fingers are disposed, respectively. The light sources 23 are fixed by a light source supporting unit 105. It is preferable that the light source irradiate beam-shaped light having an irradiation width as narrow as possible, such that the light source irradiates the light onto the finger within an irradiation range of the light to the finger. In this way, it is possible to suppress unnecessary light from being generated, which improves the contrast in the blood vessels. In this embodiment, one light source supporting unit 105 includes four light sources, but the invention is not limited thereto. The number of light sources that are included in one light source supporting unit is not limited as long as transmission light can be sufficiently irradiated onto the finger. In order to photograph the three fingers, imaging devices 9 are disposed below the openings, respectively. As shown in FIG. 2B, each of the imaging devices 9 is disposed in a space that is surrounded by partition walls 106.

Figure 3:
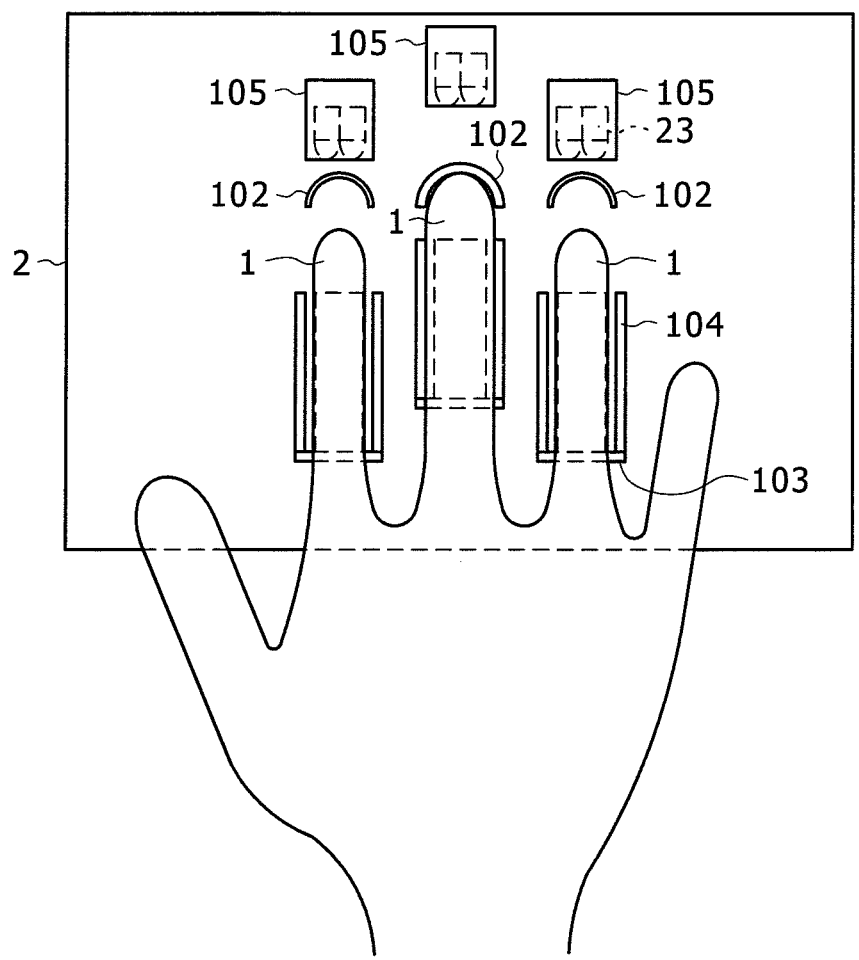
FIG. 3 is a diagram illustrating a state where an authentication device in FIGS. 2A to 2C is used.

FIG. 3 shows a state where fingers 1 are presented to an input device 2 shown in FIGS. 2A to 2C. A user places his/her middle finger in the middle opening 101. At this time, when a right hand is presented, a ring finger and an index finger are naturally placed in the right and left openings, respectively. The finger tip is disposed on the finger placement table 102 for a finger tip. However, since the middle finger is generally the longest finger, the finger tip of the middle finger is disposed on the middle finger placement table 102 for a finger tip. As a result, the location of the middle finger in an anteroposterior direction is determined. The ring finger and the index finger that are adjacent to the middle finger at both sides thereof are shorter than the middle finger and does not reach the finger placement tables 102 for finger tips of the ring finger and the index finger. However, the location of the middle finger in an anteroposterior direction is already fixed and thus the locations of the ring finger and the index finger adjacent to the middle finger at both sides thereof in an anteroposterior direction become fixed according to the location of the middle finger. The locations of all the fingers in a horizontal direction are defined by the sidewall 104 or the finger placement tables 103 for the finger base portions. In particular, the sidewall 104 protrudes upward so that the finger 1 will not deviate in a horizontal direction. As a result, the three fingers are fixed at predetermined locations whenever the three fingers are presented.

In this embodiment, the middle finger placement table is shown to have a large size so as to visually or structurally emphasize the middle finger placement table. Accordingly, the middle finger that is generally longest may be easily guided to the middle finger placement table, which makes it possible to provide an interface convenient to a user.

In this embodiment, the middle opening 101 protrudes more forward than the openings adjacent to the middle opening 101 at both sides thereof. This is to photograph approximately first joint regions in almost all of the fingers. Since the first joint region has a relatively thin outer skin and its internal blood vessel patterns can be clearly observed, it is possible to realize a high-precision authentication process by photographing the joint region. Since the first joint region of the middle finger protrudes more forward than the first joint regions of the fingers adjacent to the middle finger, if the middle opening is further protruded forward, it is possible to photograph the first joint regions in almost all of the fingers.

If any finger other than the middle finger is longest, the finger placement table 102 for a finger tip is included even in any finger presenting unit. Therefore, it is possible to place the finger tip on the finger placement table for the finger tip that exists at a location where the corresponding finger can be most easily placed.

As such, the finger placement tables are arranged in one line in a depthwise direction. Only a tip of the longest finger is placed on the finger placement table to determine the location of the finger, and the locations of the tips of the other fingers are fixed on the basis of the location of the tip of the longest finger. In this structure, three fingers can be simultaneously presented without depending on the lengths of the middle finger, the index finger, and the ring finger or a difference between the lengths.

As exemplified in FIG. 2C, the light source 23 irradiates light onto the finger from an oblique upper side of the finger at the side of the finger tip. At the time of photographing the veins, light transmitted from a direction that is opposite to the location where the veins are observed is detected, and thus an image having the highest contrast is obtained. However, in order to irradiate light from the location that is opposite to the location where the veins are observed, the light source needs to be disposed on the opening. If any structure exists on the opening, it becomes difficult to displace the finger and a place where the finger is placed is visually blocked, which increases user's psychological resistance. Accordingly, in this invention, the light source 23 is disposed at the side of the finger tip and irradiates light onto the finger from the oblique upper side thereof. In this structure, it is possible to alleviate user's psychological resistance when the finger is presented and to photograph the finger having high contrast that is the merit of transmission light. As a result, it is possible to realize high usability and high-precision authentication.

Further, it is preferable that the transmission light is uniformly irradiated onto the finger and light having strong intensity be efficiently transmitted through the finger. In this embodiment, on the assumption that the finger has a size larger than a general size, light is irradiated onto a region near the base portion and the center of the opening using the plural light sources 23a and 23b, such that an incident angle of approximately 30 degrees is formed with respect to the surface of the finger at the palmar side. If the incident angle is decreased, the arrangement height of the light sources becomes low and thus the device can be reduced in size. However, since a range where light is irradiated by one light source is increased to a wide range that ranges from the finger tip to the base portion, light incident efficiency becomes lowered, which makes it become difficult to obtain a clear image having high contrast. In contrast, if the incident angle is increased, the light can be pinpoint-irradiated onto the finger over a narrow range while increasing incident efficiency, but the location of the light source needs to be heightened. As a result, the size of the device is increased and a distance from the light source to the finger is increased, which increases light attenuation and decreases the amount of light. Accordingly, the incident angle is set according to the size of the device, intensity of light emitted from a light-emitting element used in a light source, or a divergent angle of irradiated light. Since the thickness of the finger is different from each individual person, the plural light sources 23a and 23b are configured such that they can be independently controlled. Further, the plural light sources 23a and 23b are automatically controlled so as to maintain brightness uniformly as much as possible.

If reflected light is irradiated onto a surface of a portion of the finger where veins are photographed, wrinkles of the finger surface are emphasized and an image quality of veins is deteriorated. Further, if light that is not transmitted through the finger is instead directly incident on a camera, luminance is partially increased and a pixel value is saturated, which makes it impossible to observe peripheral veins. Further, the light is scattered in the device and reflected on the surface of the finger, thereby deteriorating an image quality. In order to prevent unnecessary external light from leaking, in this invention, the opening 101 is designed to be sufficiently narrow with respect to the finger width and the finger closes the opening, thereby preventing external light from being directly incident on the device. That is, the sidewalls 104 are provided at both sides of the opening 101. These sidewalls 104 are used to position the finger in a horizontal direction and to block unnecessary light such as external light such that the external light is not irradiated onto the sides of the finger 1. In this way, it becomes difficult for unnecessary reflection light to be generated on the surface of the finger to be photographed and for the light to be directly incident on the camera. Further, it is possible to prevent irradiating of unnecessary external light having strong intensity onto the sides of the finger to make one surface of the finger become extremely bright and oversaturating a half of the surface of the image. Accordingly, it is possible to photograph veins with high contrast.

Only the sidewalls 104 are located at intervals between the three openings. The sidewalls 104 function even if a width thereof is narrow, and other structures do not need to be disposed. Thus, the openings can be disposed to be adjacent to each other. Therefore, even though a user has small fingers, it is possible to easily present his/her finger.

In consideration of the case where the opening is not closed due to any injury due to the finger, a structure is required, which can prevent photographing of other fingers from being affected due to external light permeating through the opening. As shown in FIG. 2B, in this invention, the spaces below the openings 101 are surrounded by the partition walls 106, and imaging devices 9 are disposed in the spaces. Each of the partition walls 106 functions as a light shielding wall. Accordingly, the imaging device 9 is not affected by light permeating through the openings other than the opening right above the imaging device 9, which enables veins of the finger to be reliably photographed.

As exemplified in this embodiment, when plural fingers are simultaneously disposed, it is difficult to rotate (roll) the finger using a major axis of the finger as a base axis. Therefore, since the locations of the photographed veins become stabilized, it is possible to increase authentication precision.

Figure 4:
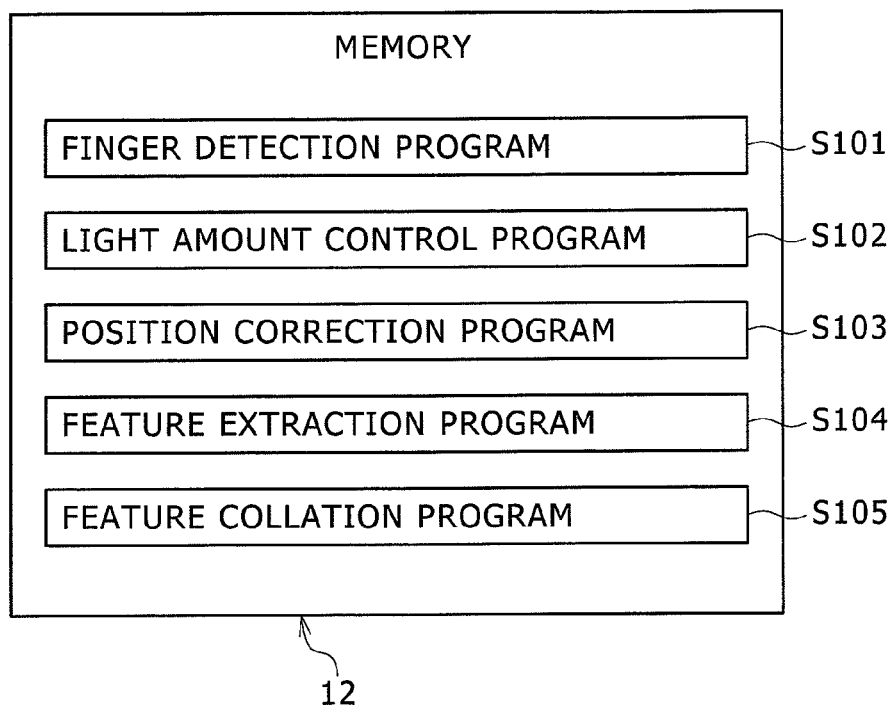
FIG. 4 is a schematic process block diagram illustrating a finger vein authentication device.

FIG. 4 shows a process block of an authentication device using veins of plural fingers. A basic authentication process flow will be described with reference to FIG. 4. First, a finger detection process (S101) is performed to detect that a finger is presented. Then, a light amount adjustment process (S102) is performed to irradiate light according to the amount of light that is suitable for photographing veins. Then, a position correction process (S103) is performed to correct a position deviation of the finger, and a feature extraction process (S104) is performed to extract features of the veins. Finally, a collation process (S105) with registered feature data is performed to determine whether a corresponding person is a registered person.

As a specific example of the finger detection process, the light source 23 is flickered to investigate a luminance value of an image obtained from the imaging device 9 and how much a luminance value when a shielding material is interposed between the light source 23 and the imaging device 9 is decreased. Alternatively, a touch sensor may be provided in the finger placement table 102 for the finger tip or the finger placement table 103 for the finger base portion so as to detect a contact.

At this time, the finger detection process may be performed including a process that detects when the finger is stopped. At the same time as the light amount adjustment process (which will be described in detail below), the veins of the finger are photographed and the feature extraction process and the collation process (which will be described in detail below) are continuously performed, thereby measuring the amount of position deviation of the finger in real time. After a predetermined time, when it is determined that the amount of position deviation of the finger is small, this means that the finger has stopped moving, and the process proceeds to the following processes.

In the light amount adjustment process, a feedback control operation is performed such that a luminance value of the photographed image becomes a predetermined value. Basically, the light amount adjustment process is performed at a high speed using a method that estimates the amount of light where a target luminance value of an image on the basis of a luminance value of the image when light is irradiated in accordance with the initial amount of light.

In this invention, as shown in FIGS. 2A to 2C, the light source is disposed over the finger tip, the base portion of the finger is distant from the light source with respect to the finger tip, and the size of the finger is increased. As a result, light cannot be sufficiently irradiated onto the base portion of the finger and thus the obtained image may be dark. For this reason, the light sources 23b and 23a are disposed in two directions toward the finger tip side and the base portion side and independently controlled. That is, the amounts of light from the light sources 23a and 23b are controlled in order that intensity of light emitted from the light source 23a disposed such that the light is irradiated onto the base portion side of the finger is stronger than that of light emitted from the light source 23b disposed such that the light is irradiated onto the finger tip side. As a result, light can be uniformly irradiated onto the entire finger and veins can be photographed with high contrast without luminance irregularities. However, when the plural independent light sources are used, one-side light amount control affects the other-side light amount control.

As shown in FIG. 5A, when two light sources, that is, the light source 23b that irradiates light onto the finger tip and the light source 23a that irradiates light onto the base portion exist, the photographed finger image 120 may be divided into two parts and the light sources 23a and 23b may independently control luminance values in the regions 120a and 120b on the respective images as target values, respectively. When it is determined that the intensity of the light emitted from the light source 23b at the side of the finger tip is weak, the amount of light from the light source 23b is increased, which affects the region 120a of the base portion side of the finger. Meanwhile, it becomes necessary to control the light source 23a of the base portion side such that the intensity of light therefrom becomes weak, which affects the region 120b of the finger tip side. As such, the light sources affect the respective regions, and the control becomes finally unstable.

When the regions are divided, setting parameters due to light influence from each other is considered, which is called a coupling coefficient in this embodiment. The influence parameter of the region 120b of the finger tip side is represented by linear coupling between an influence by the light source 23b at the finger tip side and an influence, which is obtained by multiplying an influence by the light source 23a at the base portion side of the finger by a coupling coefficient. Accordingly, the two regions are affected by both light sources, but it may be considered that the influences by the light sources are different from each other. This state can be represented by simultaneous equations. FIG. 5B shows a state in which brightness of the region 120a is affected by the light sources 23a and 23b. In FIG. 5B, $\sigma aa$ denotes a coupling coefficient indicating a degree to which the region 120a is affected by the light source 23a, and $\sigma ab$ denotes a coupling coefficient indicating a degree to which the region 120a is affected by the light source 23b. Further, Pa and Pb denote the amounts of light from the light sources 23a and 23b, respectively, b0 denotes an offset value of brightness of an image when the amount of light is zero, Ia and Ib denote average luminance values of the regions 120a and 120b, respectively, and f and f' denote coefficients that indicate relationships between the strength of the light sources and the luminance values on the image. In FIG. 5B, these relationships are approximated in a linear expression. The brightness of the region 120a on the actual image is obtained by adding an offset value b0 of the brightness of the image to a sum between the influences by both light sources. FIG. 5C shows the result obtained by formulating the above-described state.

Expressions f and f' are linear expressions (f=ax and f'=a'x), unknown integers a and a' are determined by finding out P and I. These equations can be solved as simultaneous equations. If the integers a and a' are determined, specific values of the amounts of light Pa and Pb can be inversely calculated to define Ia and Ib as target luminance values. The finally obtained light amount values can be determined as values that make it possible to optimally control the luminance values of both regions.

Since the coupling coefficients are basically a unique value of the device, optimal values are previously calculated through experiments and stored in a memory 12. In addition, when the amount of light is adjusted, a CPU 11 refers to a specific value of the coupling coefficient and calculates average luminance values Ia and Ib in the image, thereby calculating solutions a and a' of the above-described simultaneous equations. As a result, since the amounts of light Pa and Pb that are to be subsequently irradiated are obtained, it is possible to always irradiate light having appropriate strength.

This method may be applied to the case of adjusting the amount of light of a device that includes plural imaging devices and light sources. For example, in FIGS. 2A to 2C, the middle imaging device is affected by not only the middle light source but also the light sources adjacent to the middle light source at both sides thereof. In this situation, in order to optimally adjust the amount of light, the degree to which the middle imaging device is affected by the light sources adjacent to the middle light source at both sides thereof is calculated as a coupling coefficient and simultaneous equations are analyzed, thereby obtaining the optical amount of light. Each of the imaging devices is operated on a time basis by switching each imaging device and only the light source corresponding to an operation thereof is allowed to emit light, which enables light amount control that does not affect another imaging device without considering the coupling coefficient.

However, since overhead of the switching time causes the photographing to be delayed, it is required to provide an imaging device or light source in which an operation can be switched at a high speed.

Next, a specific example of the correction process of the position deviation of the finger will be described. Since the camera photographs a two-dimensional image, if the position deviation of the finger occurs, patterns are viewed differently. In order to realize a stabilized authentication process, the finger needs to be disposed on the finger placement table so as to hold the finger at a predetermined location. For example, the finger is held such that its displacement angle becomes a predetermined angle in a constant direction by the sidewalls 104, and the finger is displaced on the finger displacement table in a contact state. As a result, a distance between the finger 1 and the imaging device 9 becomes a predetermined distance and an enlargement ratio is maintained. However, the finger is an elastic body and the finger cannot be placed at the same location every time due to a pressure difference when the finger is placed. If an angle at which the finger is placed is deviated, a concordance rate with patterns at the time of registration is decreased in performing the collation process of features of the vein patterns. Therefore, it is required to correct an angle deviation of the features of the vein patterns.

The opening 101 is designed to have a width narrower than the finger width in order to block external light. Accordingly, it is not possible to photograph the outline of the finger and to correct feature patterns of blood vessels according to a finger placement angle. In consideration of this problem, in this invention, rotation correction that does not use outline information is carried out.

As the rotation correction method, a method that rotates patterns at various rotation angles with respect to any central point, collates all rotation patterns with registered patterns, and adopts a result having the highest concordance rate as the collation result, or a method that analyzes linear components of blood vessel patterns by an average vector and rotates the direction vector in a predetermined direction may be used. In particular, since the latter generates only one rotation pattern, the latter has advantages in that the speed of the authentication process can be easily increased, and the collation result with another finger is rarely deteriorated. However, the latter has a disadvantage in that it is susceptible to noise of an image. Accordingly, if the two methods are combined and performed, it is possible to further improve a desired effect.

Similarly, in regards to a variation in an enlargement ratio, some enlarged and reduced patterns are generated, registered patterns and all the enlarged and reduced patterns are collated with each other, and the collation result with patterns having the highest concordance rate is used, which enables collation in consideration of the variation in the enlargement ratio.

In particular, in the structure according to this embodiment, it is assumed that the finger tip comes into contact with the device but the base portion of the finger is separated from the device, and thus the variation in the enlargement ratio becomes different depending on each portion in the image. In regards to the enlargement ratio correction, plural patterns, which are obtained by smoothly varying the enlargement ratios of the finger tip and the finger base portion, are generated, which enables a collation process in which the deformation of patterns is absorbed.

As described above, in addition to the method that a direction of the finger is corrected on the basis of direction of the vein patterns, a method that corrects the direction of the finger using information based on the surface of the finger may be used. According to the method using the information of the surface of the finger, the direction of the finger can be corrected by only observing local regions whose pitches are narrower than those of the veins. When wrinkles at joint portions of the finger can be observed, line direction thereof can be corrected to a predetermined direction. In order to photograph the finger surface, a reflection light source may be disposed in the device.

When plural fingers are photographed, a direction of a position deviation or an angle deviation of each finger is generally the same. Accordingly, with respect to only blood vessel patterns of any finger, differences with the registered patterns in a rotation angle or an enlargement ratio are calculated. With respect to the other fingers, a range for estimating the conventional deviation amount is restricted within a narrow range on the basis of the calculation result, which enables a high speed process as a whole.

One embodiment of the high speed process will now be described. First, with respect to only the finger that is placed on the middle opening, collation with registration data is performed. At this time, as described above, input patterns are rotated and enlarged and reduced to generate plural patterns having various rotation angles and enlargement ratios. The number of generated patterns is increased or decreased according to a maximum value of the rotation angle or the enlargement ratio or a resolution, but is set according to allowable deviation amounts of the rotation angle and the enlargement ratio, which are defined by a system. Then, patterns having the highest concordance rate with registration data are selected from the generated patterns and the rotation angles and the enlargement ratios of the input patterns are obtained. The obtained values are stored in the memory 12. Then, with respect to the fingers that are placed on the remaining openings, a collation process is performed. In the same method as the collation process with respect to the middle opening, the input patterns are converted into patterns having various rotation angles and enlargement ratios and the collation result is obtained from the generated pattern having the highest concordance rate with the registration data. At this time, the maximum values of the rotation angle and the enlargement ratio of the generated pattern are restricted to small values using the results of the rotation angle and the enlargement ratio of the finger that is placed on the middle opening. As a result, it is possible to reduce the number of generated patterns. This is because it is assumed that, when the middle finger rotates and is enlarged, the remaining fingers also rotate at the same angle and are enlarged to have the same size. In contrast to the assumption, when the remaining fingers have the rotation angles and the enlargement ratios that are different from those of the middle finger, excessively strong power is applied to the fingers. Or, the fingers may be presented accompanied by large deformations. In this case, since accurate collation cannot be made, it is rarely needed to consider this situation. Accordingly, if the present method is used, the number of generated rotation and enlargement patterns can be reduced without lowering collation precision, and a collation process method against the rotation and enlargement deviations of the finger can be executed at a high speed.

In regards to the feature extraction process, as a process for emphasizing line patterns, a method using a matched filter, a method that tracks lines, and a method that detects a void of a luminance profile are used.

Next, a collation process will be described. In the collation process, the collation data registered in the storage device 14 and the input collation data are compared with each other by the CPU 11 so as to evaluate similarity. The registration data and the input data overlap and the number of pixels in a region where a blood vessel portion and the other portion overlap is counted, thereby calculating how much the registration data and the input data are different from each other. A threshold value of similarity that is set in advance on the basis of a statistical method is stored in the storage device 14 or the memory 12. In accordance with the threshold value, the CPU 11 determines whether the patterns are the same and executes an authentication process, when it is determined that the patterns are the same. In this embodiment, in order to photograph three fingers, registration data is also handled as one set of finger data that includes data on three fingers. At the time of comparison, the finger data is compared one by one and similarity with respect to the corresponding finger is evaluated. At this time, an average of three similarities may be used as a final determination reference, or after determining whether the data is the same in each finger, a final determination may be performed according to the number of fingers that are determined that the data is the same.

In particular, in the method of the latter, authentication results of the individual fingers may be combined and authentication precision may be flexibly controlled. For example, when it is determined that data of all of the plural presented fingers is the same as the registration data and all the data is authenticated, a false reject rate (FRR) is lowered two times as much as the number of fingers and a false accept rate (FAR) is lowered by the square of the number of fingers, which results in increasing authentication precision. Even when there are fingers where accurate vein patterns cannot be photographed among the plural fingers, if it is confirmed that data of M fingers among N presented fingers is the same as the registration data, setting is made such that an authentication process is performed. Therefore, the authentication process can be performed even if some fingers may be injured. Further, since a value of N is a device unique value, the value is fixed, but a value of M may be dynamically changed depending on a system security policy.

In a process in the case where there are fingers that cannot be photographed, a security level is lowered with respect to a general authentication process. Accordingly, a threshold level for authentication may be changed according to the number of fingers that cannot be photographed. If the number of fingers that cannot be photographed is increased, the threshold level is strictly set, thereby maintaining a high security level of an authentication system.

In a large-scale personal authentication system, in order to maintain high usability, (1-N) authentication needs to be performed, which does not require an input of an ID number. Meanwhile, it is required to increase a speed of a collation process as well as authentication precision. In the above-described embodiment, the data of the three fingers is input. However, when all registration data of the fingers is sequentially collated, a process time is increased in proportion to the number of registration data. Accordingly, a method that can effectively perform a collation process at a high speed while omitting an unnecessary collation process and maintain authentication precision is effective. An embodiment of this method will be described below. However, when plural candidates exist in the registration data, the registration data having the highest accuracy becomes an authentication subject.

First, focusing on a first finger among the three fingers, data of the first finger from all the registration data is collated with input data of the first finger. If the present system is set to perform an authentication process when all of the data of the three fingers is the same as the registration data, the authentication process is not performed on the registration data that is not the same as the collation result, the corresponding data is excluded from the authentication candidates, and a collation process on the second and third fingers is omitted. If the present system is set to perform an authentication process when only data of at least two fingers among the three fingers is the same as the registration data, a collation process is continuously performed on the second finger. At this time, if the data of the first and second fingers is not the same as the registration data, a collation process on the third finger may be omitted. If the present system is set to perform an authentication process when data of any one of the three fingers is the same as the registration data, the collation process needs to be continuously performed until the collation process on the third finger. During the collation process, even when registration data that satisfies authentication conditions appears, it is required to analyze data having the highest accuracy. Therefore, the collation process needs to be continuously performed, except for the cases where the collation process can be omitted. In this method, if the present system is set to perform a process other than an authentication process when data of any one of three fingers is the same, it is anticipated that the amount of processes can be considerably reduced and a high-speed process can be achieved. For example, in the case where the present system is set to perform an authentication process when data of the two fingers among the three fingers is the same, if a range of candidates can be narrowed to about several percentages by collating of the first and second fingers, the process time can be reduced to about ⅔ of the process time, which is needed when all the fingers are collated.

When performing collation of the first finger, the registration data is rearranged in the order of data having high correlation coefficients and collation of data having low correlation coefficients is stopped, thereby considerably increasing a process speed. In this case, however, even though authentication precision is slightly lowered, if the number of data where collation is stopped is set such that authentication precision statistically does not change, a high-speed process can be achieved while the authentication precision can be regularly maintained as a whole. Further, if there is a case where an authentication process may be completed at a point of time when one authentication candidate is observed, the probability of the authentication candidate being at the head by a rearranging process becomes high, thereby achieving a high-speed authentication process.

Further, a high-speed process can be performed using data that is obtained by compressing the amount of collation data of one finger. For example, if finger vein data is spatially reduced, the amount of data can be reduced while the original vein shape is maintained as is. A collation process is performed using the data and a collation process on data having low collation coefficient is stopped, the process can be performed at a process speed faster than that of the above-described method. At this time, since the amount of data is reduced, the collation precision is lowered, but when determining data on which the collation process is to be stopped, a threshold value that is capable of sufficiently securing authentication precision using data before compression, is statistically determined, thereby achieving final authentication precision. With respect to registration data that remains as candidates, it is confirmed whether an authentication process can be finally performed using data before compression, thereby performing a reliable authentication process.

As described above, by performing stopping of collation for each finger, rearranging of data according to a correlation value, and compressed data, it is possible to achieve a high-speed, high-precision, and large-scaled 1-N authentication system using plural fingers.

Figure 6:
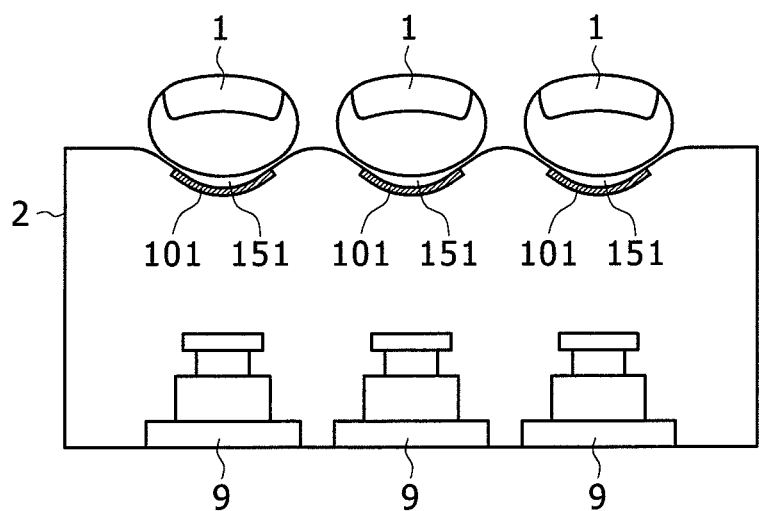
FIG. 6 is a schematic diagram illustrating interfaces of a device for authenticating veins of plural fingers.

FIG. 6 shows an embodiment of a finger vein authentication device that defines a location of a finger using a groove installed in a device surface. A groove that forms a curve line whose section is smooth is provided in a surface of the input device 2 and the opening 101 is provided in a concave portion 151 of the groove. At this time, the finger 1 that has a natural shape is disposed in a concave portion of the groove. Further, a convex portion that is raised from the concave portion of the groove serves as the sidewall 104 in FIGS. 2A to 2C, which prevents a position deviation of the finger 1 in a horizontal direction, and blocks external light from a horizontal direction. In particular, if the section of the groove has a shape of a curve line that corresponds to the shape of the section of the finger, the positioning of the finger can be stably performed regardless of the size of the finger.

FIGS. 7A to 7C show an embodiment of a device for authenticating veins of plural fingers that can detect the outlines of fingers. In the embodiment that is shown in FIGS. 2A to 2C, the outline of the finger cannot be observed from the opening 101 and the position deviation of the finger, such as the rotation of the finger or the change in the enlargement ratio, cannot be accurately corrected. In the device shown in FIGS. 7A to 7C, the opening 161 that observes the outline of the finger and an imaging device 162 that observes the outline of the finger are included at the finger tip side and the finger base portion side. The opening 161 opens to be sufficiently wide with respect to the finger width, and the outline of the finger can be confirmed. In order to clearly observe the outline of the finger, a reflection light source that illuminates the surface of the finger may be included in the opening 161. The reason why an imaging device 162 that observes the outline of the finger is provided in addition to the imaging device 9 that photographs the veins is because the imaging device 162 prevents unnecessary external light from being incident on the imaging device 9 from the opening 161 used to photograph the outlines. The imaging device is separately prepared, unnecessary external light is blocked by the partition walls 106, and an image quality of a vein image is prevented from being deteriorated.

When an influence due to the unnecessary light may be ignored, the imaging device 9 and the imaging device 162 that observes the outline of the finger may be implemented by one device. As a result, manufacturing costs can be reduced.

FIGS. 8A to 8E show an example of a finger outline detection process of a device that is shown in FIGS. 7A to 7C. FIG. 8A shows a finger vein image 170 that is used in the related art. In the finger vein image, the outline 173 of the finger is photographed and information on a parallel location or an angle of the finger can be obtained. Therefore, the parallel location and angle of the finger can be corrected to become the predetermined location and angle. FIG. 8B shows a finger vein image 171 that is photographed from an opening 101 in an embodiment of the invention shown in FIGS. 2A to 2C. Since the opening 101 is designed to be narrower than the finger width, the outline of the finger is not photographed, and it is difficult to accurately correct the location of the finger. FIG. 8C shows a finger vein image 171 that is photographed by an authentication device shown in FIGS. 7A to 7C and an image 172 of the outline of a finger that is obtained by an imaging device 162 that observes the outline of a finger. Since the image 172 of the outline of the finger is photographed in addition to the image shown in FIG. 8B, it is possible to detect the location of the finger. FIG. 8D shows an example where a finger outline 173 is detected from an inner portion of an image 172 of the outline of a finger. The outline of the finger is defined as a boundary between an image of the finger and an image of a background. At this time, an arbitrary edge is extracted from the image, thereby obtaining the location of the outline of the finger. In particular, when photographing the outline of the finger, the light source 23 flickers in time series to obtain a differential image between an image of the outline when the light source 23 is turned on and an image of the outline when the light source 23 is turned off, resulting in emphasizing an edge portion of the finger. From the outline 173 of the finger that is obtained by the above manner, a central line 174 of the finger is calculated. If the vein image 171 rotates such that the central line 174 becomes vertical, the rotation of the finger can be corrected. If regulating the enlargement ratio of the image according to the width of the outline 173 of the finger, the enlargement ratio of the finger can be corrected.

Figure 9A:
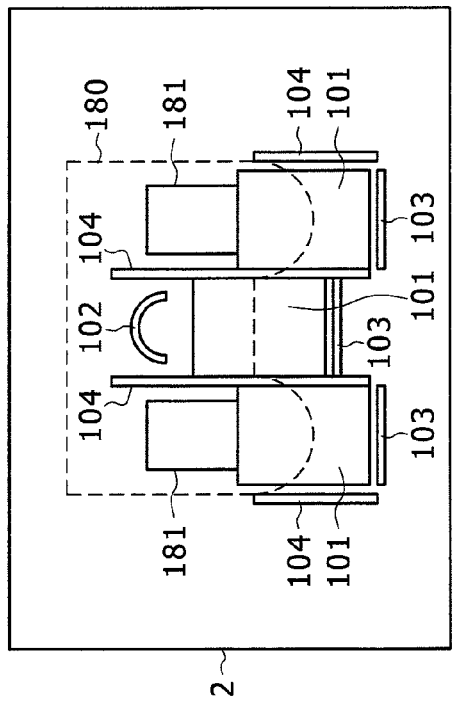
FIGS. 9A to 9C are schematic diagrams illustrating a device for authenticating veins of plural fingers having light sources formed thereon.
Figure 9B:
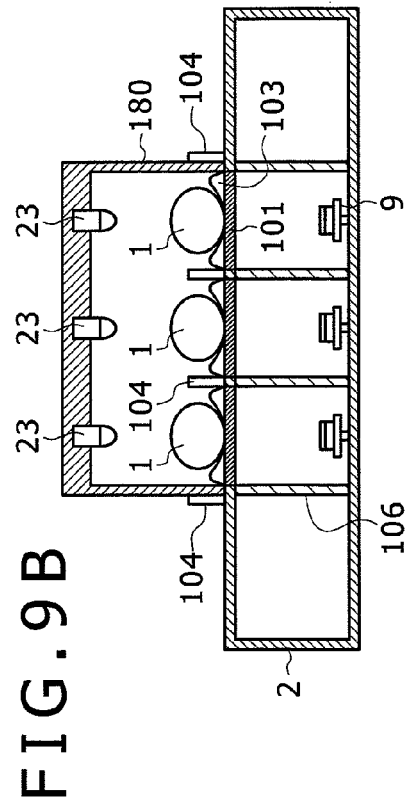
Figure 9C:
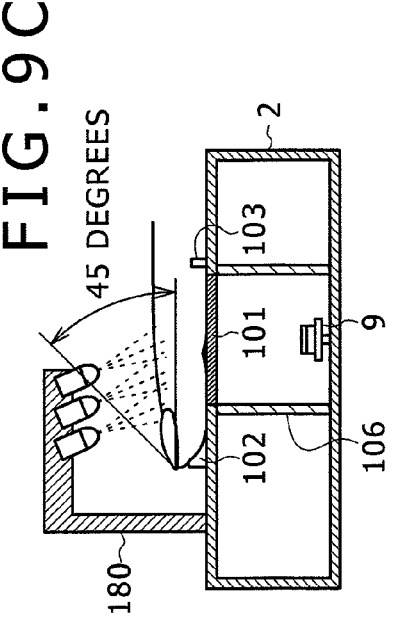

FIGS. 9A to 9C show an embodiment of a device for authenticating veins of plural fingers that includes light sources formed thereon. Specifically, FIG. 9A shows a top view, FIG. 9B shows a front view, and FIG. 9C shows a side view. A top cover 180 is disposed in the device in order to allow the light source 23 to irradiate light from the upper side, and the light sources 23 are arranged in the top cover 180. Since the light can be irradiated onto the finger 1 from the upper side, contrast of a vein image of the finger can be improved, and the light can be efficiently irradiated. Since the device can shield light from the upper side, the device becomes strong in preventing leakage of external light.

In this embodiment, the finger placement table 102 for a finger tip of the middle finger is disposed in the same type as the above-described embodiment, but positioning grooves 181 for finger tips of the fingers adjacent to the middle finger at both sides thereof becomes an elongated void. This is made in consideration of that it is difficult to visually position the fingers due to the arrangement of the top cover 180 and due to this, the position deviation of the finger in a horizontal direction may occur easier than the case of the embodiment shown in FIGS. 2A to 2C. If the grooves are formed, it is possible to effectively suppress the position deviation from occurring in the horizontal direction. At this time, the locations of the fingers in the in the anteroposterior direction are not fixed.

The top cover 180 is disposed to cover portions near the finger tip from the upper side and covers a half of the surface of the finger tip at the opening 101. Therefore, it is open, as compared with the shape of the device according to the related art that covers the entire finger. In particular, as shown in FIG. 9C, the finger placement table 102 for a finger tip of the middle finger is designed to be visually recognized at an angle of 45 degrees from the upper side of the device. For this reason, since a user can easily recognize a finger placement location, the usability can be improved.

As can be recognized from FIG. 9C, the light source 23 that is disposed in the top cover 180 is disposed at a slight angle such that it irradiates light onto the center of the opening 101. This is because the cover 180 covers up to the upper side of the portions near the finger tip and thus the light source cannot be disposed right above the opening 101. When the light source is disposed right above the opening 101, it is possible to reduce a variation in a luminance value of the photographed image. Therefore, an arrangement angle of the light source 23 is inclined toward a base portion direction of the finger to reduce the variation in the luminance value, thereby improving an image quality.

The top cover 180 that has the light source 23 also has a function of shielding external light. For this reason, the top cover 180 shields infrared light and it is made of a material that does not reflect the infrared light. Different from that in the embodiment shown in FIGS. 2A to 2C, the opening 101 increases an opening width and can sufficiently photograph the finger up to its outline. Since the permeation of the external light can be reduced due to the arrangement of the top cover 180, performance deterioration can be reduced. It is possible to achieve the accurate correction of the finger location by photographing the outline of the finger.

Figure 10C:
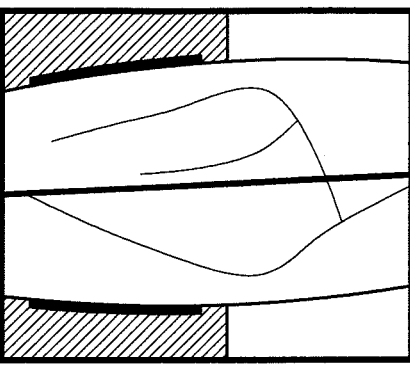
FIGS. 10A to 10C are schematic diagrams illustrating a method of detecting the outlines of fingers in FIGS. 9A to 9C.
Figure 10B:
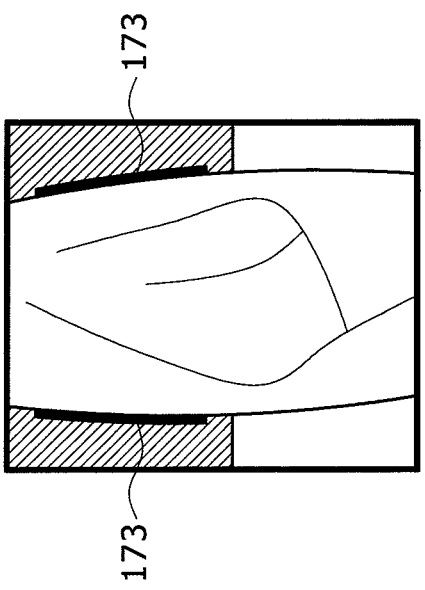
Figure 10A:
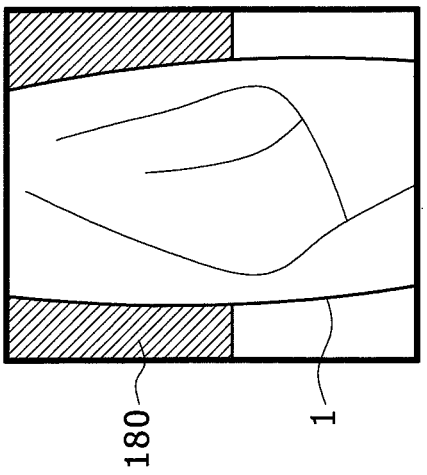

FIGS. 10A to 10C show an example of a process of detecting the outline of a finger in the embodiment shown in FIGS. 9A to 9C. FIG. 10A shows an image of a finger 1 that is obtained by an imaging device 9 in FIGS. 9A to 9C. In FIG. 10A, the finger tip side becomes an upper side of the drawing. At this time, at the rear side of the finger 1, the top cover 180 covers an upper half of a screen. Since the top cover 180 is made of a material that shields external light but does not reflect infrared light, it is shown dark on the image. The outside background of the device is reflected on a lower half of the screen. Further, the finger 1 is illuminated by the light source 23, the finger 1 is reflected as a bright object.

At this time, in the upper half of the screen, the outline of the finger is clearly reflected as an image edge. Accordingly, as shown in FIG. 10B, the outline 173 of the finger is detected with respect to only the upper half of the image. The central line 174 of the finger is calculated on the basis of the obtained information, and the location and rotation angle of the finger are regulated, which enables collation even with the position deviation. In particular, the outline of the finger at the base portion side is beyond the photographing range due to the rotation deviation of the finger. However, in this embodiment, if the correction process is performed using the outline of the finger at only the finger tip side, the rotation correction can be made using the constant information. As a result, collation can be reliably performed during rotation.

Figure 11A:
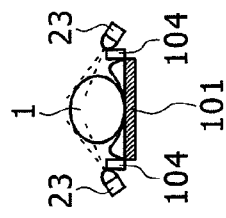
FIGS. 11A to 11D are schematic diagrams illustrating a device for authenticating veins of plural fingers that photographs fingers while sliding on the fingers.
Figure 11D:
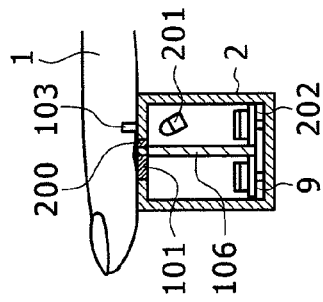
Figure 11B:
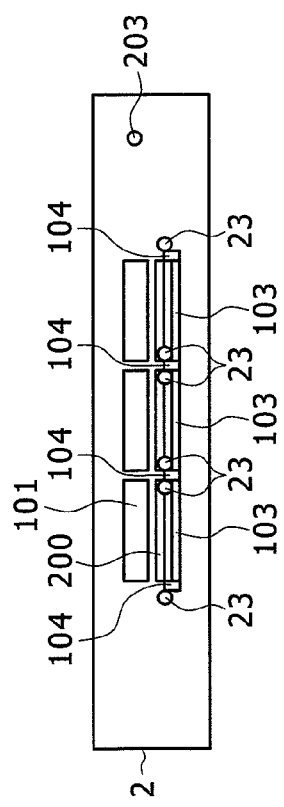
Figure 11C:
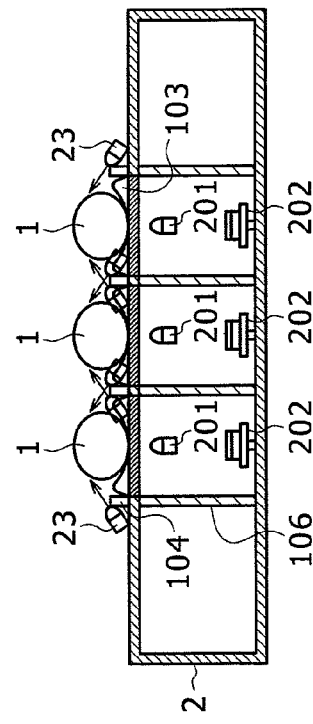

FIGS. 11A to 11C show an example of the configuration of a sweep-typed finger vein authentication device in which plural fingers are presented to the device and blood vessel patterns of the entire fingers are photographed by sliding the fingers. FIG. 11A shows a top view, FIG. 11B shows a front view, FIG. 11C shows a side view, and FIG. 11D shows an aspect of when light is irradiated in consideration of one finger. The light source 23 is disposed on the side of the finger placement table 103 for a base portion of the finger and irradiates light onto the finger from an oblique lower side. If light emitted from the light source is directly irradiated onto the surface of the finger, wrinkles of the surface of the finger may be reflected on the vein image. In this case, the light sources emit light from the side opposite to the sidewall 104 and irradiate light onto the finger 1 at the opposite side. The sidewall 104 prevents light from being irradiated onto the surface of the finger at a low location. This aspect is shown in FIG. 11D.

Further, the opening 101 that is used to photograph the vein image is formed to have a small size in a longitudinal direction of the finger, thus, the device can be reduced in size. A user presents an entire region of the finger by sliding the finger and a vein image of the entire finger can be obtained. Further, between the finger placement table 103 for a base portion of the finger and the opening 101, an opening 200 that is used to observe the surface of the finger, and a reflection light source 201 that photographs the surface of the finger in the opening 200 are disposed. Right below the opening 200 that is used to the finger surface, an imaging device 202 that obtains an image of the finger surface through the opening 200 is disposed. In addition, a partition wall 106 is disposed between an imaging device 9 that photographs a vein image and the imaging device 202 that photographs the image of the finger surface.

A user places his/her finger in a void of the finger placement table 103 for the finger base portion. As described above, if the finger detection process is performed, a sliding start lamp 203 is turned on. The user slides the finger by drawing the finger. At this time, the light source 23 and the reflection light source 201 are turned on. A partial finger image is observed from the opening 101, but the observed location is deviated in time series and presented. Finally, a partial image of the entire finger is obtained. If these images are synthesized, the finger vein image of the entire finger is acquired and an authentication process is performed.

In order to acquire the entire finger vein image from the partial finger vein image, it is required to accurately calculate the amount of position deviation when the finger is slid. Accordingly, this invention uses information on the surface of the finger that is obtained from the imaging device 202 of the finger surface. Uneven patterns, such as wrinkles, which are distributed on the surface of the finger, are dense with respect to the vein patterns. When the amount of slid position deviation is estimated on the basis of the pattern, the uneven patterns of the surface of the finger rather than the vein pattern is more preferable because the pitch between the patterns is narrow, which makes it possible to accurately measure the amount of position deviation. In particular, when the opening of the device is formed to have a small size, it is needed to acquire a position collation feature from the limited narrow region, which is more effective.

FIG. 11C shows an internal structure that is needed to simultaneously photograph the finger veins and the finger surface. The reflection light source 201 that photographs the surface of the finger irradiates light onto the surface of the finger, and wrinkles of the surface of the finger are photographed by the imaging device 202. At the same time, the light source 23 irradiates light onto the finger 1, and the internal scattered light is transmitted through the surface of the finger 1 to reach the inside of the device from the opening 101, and the finger is photographed by the imaging device 9. Therefore, the finger veins can be photographed. At this time, the light emitted from the reflection light source 201 is shielded by the sidewall 106 such that the light directly propagates to the imaging device 9.

The opening 200 that photographs the surface of the finger is preferably formed to have a small area so that the device can be reduced in size. It is required to prevent bonding precision from being deteriorated due to the reduction in the device area. In this embodiment, the opening 200 is formed to have a rectangular shape, such that the opening has a short size in a longitudinal direction of the finger and a long size in a width direction of the finger, which allows the depth of the device to be shallow. However, in order to maintain the bonding precision, it is needed to increase a frame rate of the imaging device 202 for the finger surface.

Meanwhile, in the regards to the direction of the opening 200, the opening may be long in the longitudinal direction of the finger and short in the width direction of the finger. In this case, the opening 200 is disposed closely to the outline of the finger and located in a place where the opening does not affect when the blood vessel patterns are photographed, thereby keeping the size of the device to be small. The direction where the finger is slid is a longitudinal direction of the finger. Since the opening 200 opens in a longitudinal direction, even though a large region where unevenness portions can be bonded on the finger surface is obtained and a sliding speed becomes fast, accurate boding becomes enabled. However, since the width of the opening 101 for photographing the veins needs to be narrowed by the corresponding amount, authentication precision is slightly deteriorated.

FIGS. 12A to 12C show a bonding sequence of finger veins that are partially photographed. As described above, the partial image 210 of the finger veins and the partial image 211 of the finger surface form a pair and are obtained. At this time, an emphasizing process is performed on wrinkles of the finger surface with respect to the partial image 211 of the finger surface. The partial image 211 of the finger surface that is acquired at a subsequent timing is slightly deviated in position. FIGS. 12A and 12B show a process of photographing a slightly deviated location. At this time, images that are obtained after performing an emphasizing process on the wrinkles of the finger surface are compared with each other, and the amount of position deviation is calculated. The partial images 210 of the finger veins are bonded to each other on the basis of information on the obtained amount of position deviation. In the bonding process, a partial image of a new region may be overwritten and an overlapping region of the image may be subjected to an average process. When the average process is performed, the process time is slightly needed, but the partial images may be smoothly connected to each other. In this way, the entire finger vein image 212 of the finger can be obtained, as shown in FIG. 12C. Meanwhile, if a feature extraction process of the finger veins is performed, an authentication process may be achieved.

In the emphasizing process of the wrinkles of the finger surface, an edge emphasis filter that is generally known, a matched filter, or void detection of a luminance section profile may be used. At this time, the algorithm parameter is adjusted on the basis of the exemplary width of the wrinkles on the image, which enables an optimal emphasis process. Further, if an emphasis process that emphasizes wrinkles in only a specific direction is independently performed in plural directions, it is possible to accurately calculate the amount of position deviation with respect to each direction.

Since the finger placement table 103 for a base portion of the finger shown in FIGS. 11A to 11D may press the finger 1, the finger placement table 103 is disposed to be distant from the opening 101 used to observe the finger veins, and the opening 200 that observes the finger surface is disposed in a space that is formed between the finger placement table 103 and the opening 101. As a result, a space can be reduced while accuracy of information can be prevented from being lowered due to pressing of the veins.

The imaging device for the finger surface that is shown in FIGS. 11A to 11D may use a fingerprint sensor that is generally used.

Figure 13A:
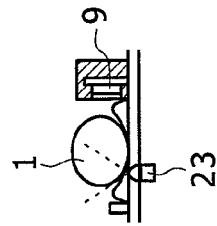
FIGS. 13A to 13D are schematic diagrams illustrating a device for authenticating veins of plural fingers that photographs veins distributed in the sides of fingers.
Figure 13B:
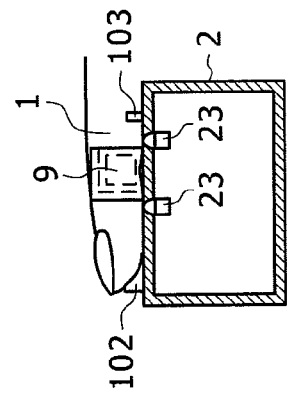
Figure 13C:
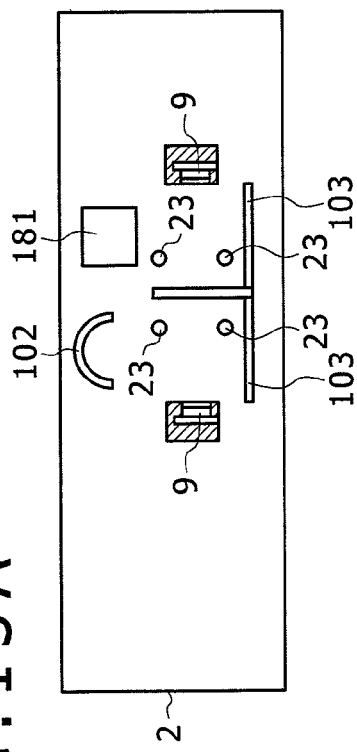
Figure 13D:
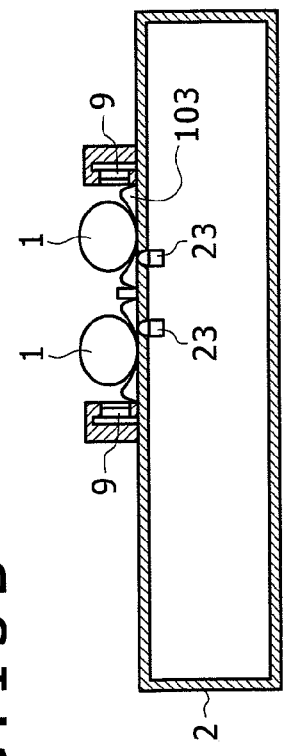

FIGS. 13A to 13D show an embodiment of a device for authenticating veins of plural fingers that irradiates light onto fingers from the palm side thereof and photographs veins of the fingers at the side thereof. Specifically, FIG. 13A shows a top view, FIG. 13B shows a front view, FIG. 13C shows a side view, and FIG. 13D shows the principle of light irradiation of a finger in consideration of one finger. In this embodiment, the case where two fingers are placed is exemplified, but the same principle can be applied to the case where one finger or three or more fingers are presented.

A user places a finger tip of the first finger on the finger placement table 102 for a finger tip and a finger tip of another finger in a groove 181 for positioning a finger tip. Since the fingers having different lengths are disposed, the location of the finger tip of the first finger in an anteroposterior direction is defined by the finger placement table 102 of the finger tip. However, the location of another finger in an anteroposterior direction is not defined. Only the location of another finger in a horizontal direction is defied by the groove 181 for positioning a finger tip.

At this time, the light source 23 closely adheres to the palm side of the finger 1. As a result, the light that is emitted from the light source 23 is efficiently incident on the inside of the finger 1. The light is scattered in the finger, and among the light that is radiated onto the outside of the finger, the light that is radiated from the side of the finger is photographed by the imaging device 9, and vein patterns at the side of the finger can be observed. As shown in FIG. 13D, the light source 23 is disposed at the location that is distant from the imaging device 9 more than the central axis of the finger. As a result, the distance between the surface of the finger that is photographed by the imaging device 9 and the light source 23 becomes far, and the amount of light that may reach the imaging device 9 without being transmitted through the blood vessel portion is reduced as compared with the amount of light that is transmitted through the blood vessel portion, which increases the contrast of a blood vessel image. Further, two light sources 23 are disposed with respect to one finger, but this is to uniformly illuminate the image. Therefore, the number of light sources is not limited, and one light source may be disposed or two or more light sources may be densely disposed, if necessary.

In the embodiment that is shown in FIGS. 13A to 13D, the finger placement table 102 and the groove 181 for positioning a finger tip are not provided, and the imaging devices 202 for the finger surface that are shown in FIGS. 11A to 11D are combined in the device, which achieves a sweep-typed device. As a result, it is possible to reduce the size of the device.

Figure 14D:
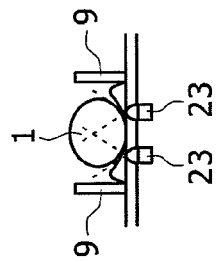
FIGS. 14A to 14D are schematic diagrams illustrating a device for authenticating veins of plural fingers that photographs veins distributed in the sides of fingers.
Figure 14C:
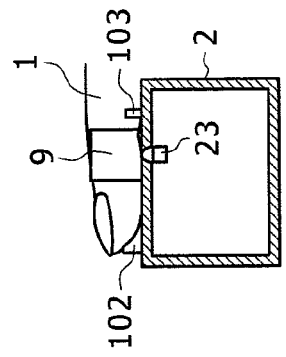
Figure 14A:
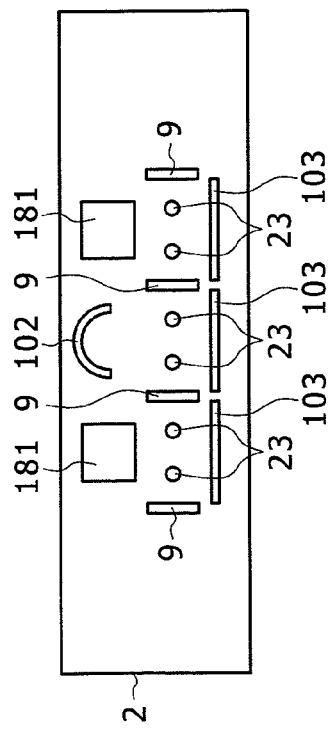
Figure 14B:
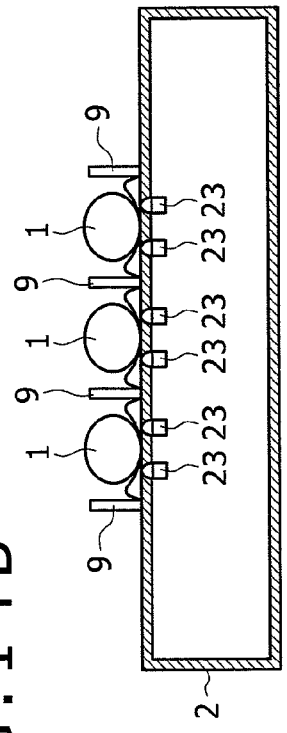

FIGS. 14A to 14D show an embodiment of the case where the imaging device 9 of a device for authenticating veins of plural fingers shown in FIGS. 13A to 13D is formed to be thin as a flat sensor. The flat sensor is very thin. In this case, two flat sensors adhere to each other with surfaces having sensitivity toward the outside, thereby forming a thin flat sensor that can photograph both sides. In this embodiment, the imaging device 9 has sensitivity on both-side surfaces while being a small size. Therefore, an imaging element that photographs sides of the finger in both directions can be disposed in a narrow space between the fingers. Accordingly, the finger can be easily presented without broadening opening. FIG. 14D shows an example of photographing a right surface of a finger when being focused on photographing one finger. The light source 23 that is at the left from the center of the finger 1 is turned on and the light source 23 that is at the right therefrom is turned off. At this time, the light that is transmitted through the blood vessels of the right surface of the finger is photographed by the imaging device 9 at the right of the finger 1. At a next timing, the left light source 23 is turned off and the right light source 23 is turned on, and the left surface of the finger is photographed by the imaging device 9 at the left of the finger 1. As such, if both-side surfaces of the finger are alternately photographed, a large amount of veins can be photographed, thereby improving authentication precision.

In the embodiment that is shown in FIGS. 14A to 14D, the finger placement table 102 for the finger tip and the groove 181 for positioning the finger tip are not provided and the imaging devices 202 for the finger surface that are shown in FIGS. 11A to 11D are combined in the device, which achieves a sweep-typed device. As a result, the device can be reduced in size.

FIGS. 15A to 15C show an embodiment of a device for authenticating veins of plural fingers that irradiates light onto plural fingers from an oblique upper side of the finger at the side. In this embodiment, a light source supporting unit 220 is disposed between two fingers, the light source 23 is disposed on the light source supporting unit 220 at an angle at which the light source 23 irradiates light onto the finger from the oblique upper side, and the light source irradiates light onto the finger from the upper side of the side of the finger. However, the light source supporting unit 220 is made of a material that does not transmit and reflect infrared light, such that it is possible to prevent an image quality from being deteriorated due to permeation of unnecessary external light. In regards to the light source and the imaged portion, from portions at a location that is opposite to the finger, a blood vessel image having the highest contrast can be obtained. Accordingly, as shown in FIG. 15B, the light source 23 and the imaging device 9 are disposed at an angle that allows the light source and the imaging device to be opposite to the location where the finger 1 is placed. Accordingly, it is possible to observe vein patterns in a slightly oblique direction with respect to the palm side of the finger. Further, since the sidewall 104 or the light source supporting unit 220 can suppress the external light from being entered, the width of the opening 101 is not narrower than the width of the finger shown in FIGS. 2A to 2C, but may be wider than the width of the finger. Therefore, since a finger vein image having high contrast can be obtained over a large area and the outline of the finger can be photographed, it is possible to accurately carry out the location correction of the finger.

In order to be easily disposed in the device, the light source supporting unit 220 has a thin structure and the light source 23 also uses a small-sized element, which prevents the finger from colliding against these structures.

The finger 1 and the outside background of the finger 1 are reflected in the obtained image. With respect to the outside background of the outline of the finger 1, the outside of the device is reflected in a half of the surface and the light source supporting unit 220 is reflected in the background of the opposite side. Accordingly, in order to correct the rotation of the finger, only the outline of the boundary between the reflection of the light source supporting unit 220 that will always be dark and the finger 1 is detected, which achieves stable finger outline detection. At the same time, the rotation correction on the finger is carried out on the basis of the obtained outline information and thus stable rotation correction of the finger can be realized. As such, in this embodiment, the place where the finger is placed is open and high-definition vein photographing is enabled, which improves usability and precision.

In the embodiment that is shown in FIGS. 15A to 15C, a structure that is capable of presenting two fingers is shown, but a structure that is capable of presenting three or more fingers may be used. In this case, since the light source supporting unit 220 is configured as thin as possible, people who have small hands can also present fingers without difficulty.

In the embodiment shown in FIGS. 15A to 15C, the finger placement table 102 for the finger tip and the groove 181 for positioning the finger tip are not provided, and the imaging devices 202 for the finger surface shown in FIGS. 11A to 11C are combined in the device, which achieves a sweep-typed device. As a result, it is possible to reduce the size of the device.

As described above, according to this invention, an authentication device can be easily disposed and have high usability while drastically improving authentication precision using veins of plural fingers as compared with the related art. Accordingly, the device according to the embodiments of the invention can be applied to management systems for entering or leaving a room that are installed in doors of houses and office buildings that a number of people use, access management systems in important management facilities, such as airports, and search systems that are used to determine whether people are included in a registration list, such as a black list. In particular, it is possible to construct a (1-N) authentication system that can simply carry out an authentication process using only a finger by improving authentication precision without being required for a user to contact an IC card or input a password, which leads to improvement in usability. As described above, the sweep-typed authentication device can be configured to reduce the size of the device. For example, the device is installed in a keyboard of a personal computer and can be applied to the PC login or settlement on the Internet. Further, the device can be applied to a banking system, such as the ATM or credit card.

FIGS. 16A to 16C show an embodiment of a device for authenticating veins of plural fingers that photographs veins of plural fingers to perform an authentication process whiling holding a portable terminal. A portable terminal 301 includes a CPU 306, a memory 303, and a wireless communication unit 305. Two grooves 304 that place the finger 1 are disposed, and in this embodiment, two fingers can be photographed. As shown in FIG. 16B, a light source 23 is disposed at the center of the grooves 304 that place the finger. As shown in FIG. 16C, a user grips the portable terminal 301 at the groove 304. At this time, the light source 23 irradiates light onto the palm side of the finger. In this state, the back side of the finger 1 comes into contact with a read terminal 310 that is separately disposed. If a touch sensor 312 detects a contact, the imaging device 313 photographs the veins of the finger at the skin side according to an instruction from the CPU 315. In this case, the number of imaging devices 313 may be the same as the number of fingers or one according to a resolution or a field angle. If the vein image of the plural fingers of skins to be photographed is processed by the CPU 315, it is determined whether the patterns are the same as the vein patterns registered in the memory 303 in advance. The registration data is registered in the memory 303. However, in order to perform a collation process, the wireless communication unit 305 and the wireless communication unit 314 may perform encryption communication with each other to read the registration data and transmit the read data to the read terminal. In contrast, the collation data may be transmitted to the portable terminal and the CPU 306 may perform a collation process. In the case of the former, a CPU having high performance does not need to be installed in the portable terminal, and in the case of the latter, since the registration data does not leak, security can be improved.

In the case where the amount of light emitted from the light source 23 is optimal at the time of photographing the finger, the wireless communication unit 305 and the wireless communication unit 314 communicate with each other, and the amount of light emitted from the light source 23 is transmitted to the portable terminal. Alternatively, an image quality is adjusted such that a gain controller 316 has optimal brightness.

As such, if the authentication process using veins of the plural fingers at the back sides is performed, an authentication process having high precision and high usability can be achieved even in a small device, such as a portable terminal. Since authentication precision is increased, the device can be applied to the settlement using the portable terminal.

Figure 17A:
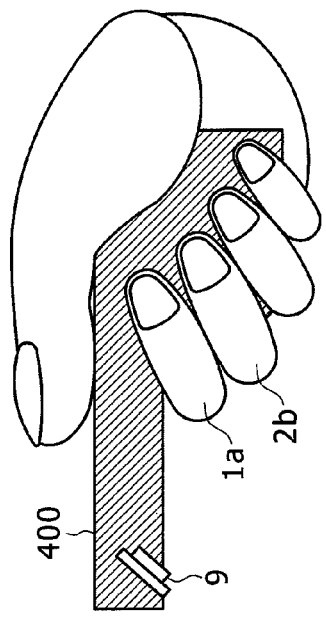
FIGS. 17A to 17C are schematic diagrams illustrating a device for authenticating veins of plural fingers that photographs vein patterns of fingers at the back sides thereof while holding a portable terminal.
Figure 17B:
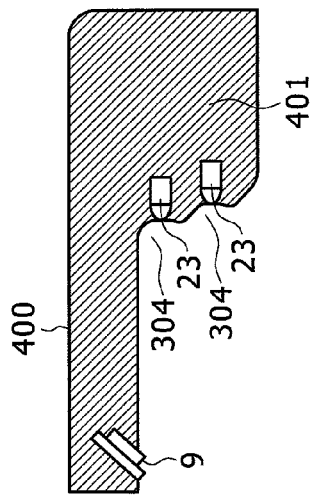
Figure 17C:
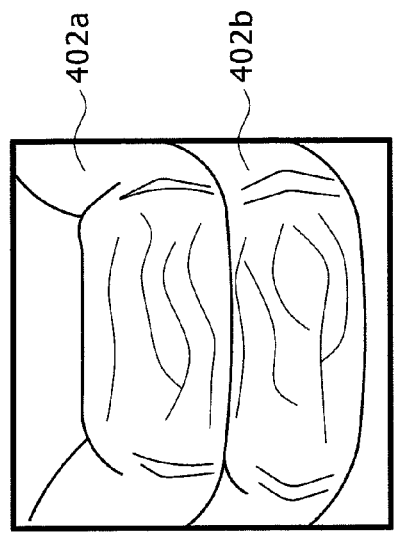

FIGS. 17A to 17C show an embodiment of a device for authenticating veins of plural fingers that photographs veins of plural fingers to perform an authentication process while holding a portable terminal. As shown in FIG. 17A, a portable terminal 400 includes a grip 401 that grips an index finger and a middle finger, plural grooves 304 that are used to place the fingers are provided in the grip 401, and the light sources 23 are placed at the central locations of the grooves. In order to detect that the finger is presented, the light source 23 lightens or flickers to evaluate an image obtained by the imaging device 9, thereby detecting when an object blocking the light source is entered, and at that time, an authentication process starts. As shown in FIG. 17B, if a user grips the portable terminal 400, the user can naturally place his/her index finger 1a or middle finger 1b on the grip 401. In this state, if the light source 23 is turned on, infrared light transmits the fingers 1a and 1b and reaches the imaging device 9. The finger vein image that is obtained at that time is shown in FIG. 17C. The veins of the fingers 1a and 1b at the back and side thereof are simultaneously photographed as images 402a and 402b by the imaging device 9. The outline of the two fingers is photographed in the image, and divided into two finger regions by an edge detection process. This is to cope with an exceptional case such as injury by independently collating one finger, which will be described in detail below. A comparison operation with two registered finger vein data is performed with respect to each finger to determine whether the data is the same. When high correlation exists between data of both fingers and the registration data, an authentication process is performed. For example, in a state where the finger is injured and a bandage is applied to the injured finger, both data are not collated with each other. Accordingly, even in the case where it is determined that only one correlation is high, an authentication process is performed. In this case, however, a threshold value is set to cope with an exceptional case such as injury without lowering a synthetic security level.

The embodiment that is shown in FIGS. 17A to 17C can be applied to a remote controller of a television or a game machine. As a result, it is possible to provide a service that enables an individual person to select a program according to his/her preference, and to authenticate a user in the game machine. This embodiment may be applied to a game using randomness of vein patterns. For example, when the device according to this embodiment is disposed with high reproducibility with respect to a registration state, it may be used when compatibility is determined by evaluating similarity of a partial shape of veins, which determines an attribute value used in a game by digitizing a partial shape of the veins.

If a push button is included in a grip unit, it is possible to trigger an authentication start by pressing the push button. As a result, power consumption of the light source 23 in a waiting state can be reduced, and a user can start an authentication process by a simple operation. An authentication start may be triggered by pressing a button of a remote controller. Further, the authentication device may be installed in a rifle or a gun and owner authentication may be performed using when a finger is locked to a trigger as an authentication trigger, preventing unauthorized utilization of the rifle or gun.

This device may be installed in an office or an automobile. A locking state becomes released by only a gripping operation, which is more convenient for a user.

While the invention has been described above in connection with the preferred embodiments, one of ordinary skilled in the art would be enabled by this disclosure to make various modifications to the preferred embodiments and still be within the scope and spirit of the invention as defined in the appended claims.

For example, in a finger vein authentication device that includes a grip unit to grip fingers, light sources to make light incident on the fingers, imaging devices to photograph light transmitted through the fingers, plural finger placement tables to place the fingers, and an image processing unit to process the obtained images, the light sources exist at the central locations of the plural finger placement tables, and the imaging devices are provided at locations that are opposite to the light sources with respect to the fingers disposed in the grip unit and photograph the plural fingers.

What is claimed is:

1. A finger vein authentication device for authenticating a person, that uses information of a vein obtained from a body, the authentication device comprising:
   a casing including a plurality of regions, each region of the casing configured to enable authentication of a finger presented thereupon;
   a plurality of light sources configured to irradiate light onto the fingers, wherein each light source is disposed to its own respective region of the casing, and wherein each light source is arranged on a side of the casing upon which a finger is presented;
   a plurality of openings, each formed in its own respective region of the casing, and configured to guide transmitted light through an inside of a finger presented on the respective region of the casing;
   a plurality of imaging devices, each imaging device corresponding to its own respective region of the casing, and disposed in the casing so as to photograph the vein of the finger on the respective region of the casing, based on the light from the respective region of the casing;
   a plurality of sidewalls, each disposed on a surface of the casing upon which fingers are presented, so as to partition between the fingers presented upon the casing, and to ensure that no finger deviates in a horizontal direction; and
   a plurality of partition walls formed to partition the plurality of the imaging devices, and to shield light inside the casing, thereby permitting only light transmitted through a corresponding finger to reach its respective imaging device;
   wherein each of the plurality of openings is disposed between sidewalls disposed to separate the fingers presented upon the casing, in order to prevent light transmitted via a finger to be guided into the casing via an opening corresponding to another finger.

2. The finger vein authentication device according to claim 1,
   wherein one of the openings protrudes more forward than the other openings.

3. The finger vein authentication device according to claim 1,
   wherein the casing includes a plurality of finger placement tables corresponding to the plurality of regions of the casing, each finger placement table configured to limit the placement of a finger.

4. The finger vein authentication device according to claim 1,
   wherein light-shielding units are provided between the plurality of imaging devices.

5. The finger vein authentication device according to claim 3,
   wherein each finger placement table has a curve-shaped cross-section at the location where a finger is to be placed.

6. The finger vein authentication device according to claim 1, further comprising:
   openings that are used to observe the outlines of the fingers; and
   imaging devices that are used to observe the outlines of the fingers.

7. The finger vein authentication device according to claim 1, further comprising:
   a plurality of supporting units configured to support the plurality of light sources;
   wherein the plurality of supporting units of the light sources cover only portions of the fingers at the side of upper front ends of the fingers.

8. The finger vein authentication device according to claim 7,
wherein the light sources are disposed in a direction where light is irradiated onto the upper side of the openings.

9. An authentication device comprising:
a casing, including a plurality of regions, configured to enable authentication of fingers presented thereupon;
a plurality of light sources configured to irradiate light onto the fingers, wherein each light source is respectively disposed to its own respective region of the casing;
a plurality of openings, each formed in its own respective region of the casing, and configured to transmit light onto a finger presented on the respective region of the casing;
a plurality of imaging devices, each corresponding to its own respective region of the casing, and disposed in the casing so as to photograph light from the respective region of the casing;
a plurality of sidewalls, each disposed to partition between fingers presented upon the casing, in order to prevent light irradiated in a region of the casing to be guided into another region of the casing, and to ensure that the finger will not deviate in a horizontal direction; and
a plurality of partition walls inside the casing that shield light, thereby permitting only light transmitted through a corresponding finger to reach an imaging device;
wherein each of the plurality of openings is disposed between sidewalls disposed to separate the fingers presented upon the casing; and
wherein an interval between adjacent sidewalls is larger than a width of an opening.

* * * * *